United States Patent [19]

Rittmayer et al.

[11] 3,900,603

[45] Aug. 19, 1975

[54] METHOD AND DEVICE FOR PRODUCING A THERMOELECTRIC GENERATOR

[75] Inventors: Gerhard Rittmayer, Erlangen; Theodor Renner, Nurnberg-Reichelsdorf; Georg Grubmüller, Nurnberg; Dieter Falkenberg, Erlangen, all of Germany

[73] Assignee: Siemens Aktiengesellschaft, Berlin & Munich, Germany

[22] Filed: Nov. 23, 1971

[21] Appl. No.: 201,355

[30] Foreign Application Priority Data

Nov. 23, 1970 Germany ............................ 2057538

[52] U.S. Cl. ................ 427/124; 136/205; 136/202; 317/234 Q; 148/133

[51] Int. Cl. ............................................... B44d 1/18

[58] Field of Search ....... 117/106 A, 215, 201, 217, 117/200, 106 R, 104, 227; 317/234 Q; 136/205; 252/62.3 T

[56] References Cited

UNITED STATES PATENTS

| | | | |
|---|---|---|---|
| 3,071,495 | 1/1963 | Hänlein | 252/62.3 T |
| 3,086,068 | 4/1963 | Charland et al. | 252/62.3 T |
| 3,222,215 | 12/1965 | Dürr | 117/106 R |
| 3,226,271 | 12/1965 | Hugle et al. | 117/200 |
| 3,331,994 | 7/1967 | Kile, Jr. | 117/106 R |
| 3,607,135 | 9/1971 | Gereth et al. | 117/106 A |

*Primary Examiner*—Cameron K. Weiffenbach
*Attorney, Agent, or Firm*—Herbert L. Lerner

[57] ABSTRACT

Method for producing a thermoelectric generator having thermocouple element legs that are located adjacent one another, thermally parallel and electrically in series, upon a carrier includes vapor-depositing a compound semiconductor, preferably zinc antimonide (ZnSb), as material for the thermocouple element legs upon a carrier and then tempering the same, the carrier being a foil of synthetic material that is wound with the thermocouple elements in the form of a spiral; and device for carrying out the method. The thermoelectric generator is suitable as a power supply for a heart pace-maker.

10 Claims, 4 Drawing Figures

METHOD AND DEVICE FOR PRODUCING A THERMOELECTRIC GENERATOR

The invention relates to method and device for producing thermocouple elements, and more particularly low output thermoelectric generators having thermocouple element legs of different conductance type. The legs are located adjacent one another in alternating sequence, thermally in parallel and electrically in series, on an electrically insulating carrier.

In thermoelectric generators, thermocouple elements are united so that the hot or cold junctions thereof are disposed in a plane, respectively, which simultaneously constitutes the hot or cold side of the thermoelectric generator. Each thermocouple element is formed of a pair of legs of thermoelectrically active material of different thermoelectric force. Preferably, p- and n-conductive, thermoelectrically active semiconductor material is employed. Contact bridges of electricity- and heat-conducting material serve to connect the legs at their hot and their cold side so that all of the legs are connected electrically in series and thermally in parallel. A heat exchanger is generally mounted both on the hot as well as the cold side of the thermocouple elements and is separated from the respective contact bridges by a layer of thermally conductive and electrically insulating material.

The efficiency of the thermoelectric generator is optimized by appropriately forming the thermocouple element legs, especially with respect to the proportion of the length to the cross section of the leg. For low output thermoelectric generators minimal leg cross sections thus result for short leg lengths, which complicates or renders more difficult the construction of such thermoelectric generators. Such thermoelectric generators of low output or capacity somewhat within the output range of a few hundred microwatts ($\mu$W), may be employed in regulating and measuring technology and as power supply systems in medicine, for example in pacemakers for the heart.

It is accordingly an object of the invention to provide an improved thermoelectric generator of low output or capacity having thermocouple element legs of semiconductor material and being of suitably small cross section; and to facilitate the production thereof.

A thermoelectric generator of low output or capacity has become known heretofore and has been used as a power supply system for a heart pacemaker (Th. F. Hursen in "IECEC 68, Record", pages 765 to 772) wherein a radioactive isotope with suitable shielding is used as power source for the hot side of the thermoelectric generator. The thermocouple element legs of this thermoelectric generator are formed of metal wires that are approximately 23 cm long and 0.05 mm thick. The hot solder points of these wires are affixed to the shielding of the isotopes and the wires are wound around the isotopes. Glass fibers are used as insulation and are woven with the wire-shaped thermocouple element legs into a band or tape. The production of this thermoelectric generator is complicated and difficult. Nickel-chromium- and constantan alloys, having a low thermoelectric effectivity are used as material for the wires of the legs. The efficiency of this thermoelectric generator is accordingly low.

A thermoelectric generator with thermocouple elements disposed on a tape or band-shaped carrier of glass fibers, is known from U.S. Patent No. 2,519,785.

The legs which are formed, for example, of bismuth-telluride are sprayed onto the insulator with the use of suitable masks. The band-shaped carrier is wound upon a hollow cylinder alternatingly with an electrically insulated intermediate layer and an intermediate layer formed of copper, which serves for the removal of heat. Sprayed-on semiconductor compounds, however, produce only poorly adhering layers with unsatisfactory electrical properties. Furthermore, the thermal decomposition of bismuth-telluride can be avoided only by taking special measures.

German Pat. No. 1,071,177 teaches, moreover, the separate vapor deposition of the thermoelectric material components according to the multi-temperature method. The legs formed of bismuth-telluride ($Bi_2Te_3$) are applied as thin vapor-deposited layers of the same material, upon an electrically nonconductive and a thermally poorly conductive carrier. The required type of conductivity for both legs of each of the thermocouple elements is obtained by vapor-deposition of a suitable dopant. Homogenization is then effected by tempering. But tempering creates difficulties, however, because on the one hand, an indiffusion of the dopant takes place only at relatively high temperatures and, on the other hand, the components of the thermocouple leg material evaporate at low temperatures. A vapor-deposited layer is provided to serve as the contact body. The entire device is in the form of a column.

It has also been proposed that a thermoelectric generator with leg lengths of a few millimeters and leg cross-sections of about 10 to 2000 $\mu m^2$ be produced. In this thermoelectric generator, the legs as well as the contact bridges, are vapor-deposited.

It is also possible for the upper end of one of the thermocouple element legs, respectively, to overlap the upper end of an adjacent thermocouple element leg. In the same manner, the lower end of one of the thermocouple element legs may overlap the lower end of a leg of the adjacent thermocouple element. Moreover, each of the thermocouple element legs may be provided, at the upper and lower end thereof, with projections that protrude in opposite directions, laterally from the thermocouple element legs, the projections of adjacent thermocouple element legs overlapping oppositely to the contact bridge. The vapor-deposited thermocouple legs and the contact bridges form a sinuous or meander-shaped tape or band.

A band-shaped, high temperature-resistant synthetic foil can be used as carrier. Almost any desired number of thermocouple element legs may be united into a thermoelectric generator. The space requirement for such a thermoelectric generator is kept low by winding the band or tape into a spiral.

It has now been recognized that such a thermoelectric generator can be further improved by changing the structure of the vapor-deposited semiconductor material and, possibly, also the structure of the vapor-deposited bridge material, after the materials have been deposited upon the insulating carrier.

To this end and in accordance with the invention, there is provided a method of producing a thermoelectric generator which comprises vapor-depositing thermocouple leg material upon a carrier consisting of a compound semiconductor, and tempering the material thereafter, to effect an alteration in the structure thereof. Due to the tempering, the amorphous phase of the semiconductor compound is converted into a crystalline phase which is also noticeable externally at the vapor-deposited legs. Due to this conversion, such a vast improvement in the thermoelectrical properties of the vapor-deposited material occurs that virtually the properties of the compact original material are attained.

It was found that by employing flash vaporization of the semiconductor compound according to the invention, stiochiometric deposition is attained. This type of vaporization has advantages over other possible methods, such as the aforementioned multi-temperature method in that it requires less expense and, with certain substances, even results in a much better leg material, in addition to the advantage that it is simpler to carry out.

It was found, moreover, that the dopant content in the semiconductor compound has no effect, or at least no noticeable effect, upon the composition of the material that was vapor-deposited according to the method of the invention. According to the vapor-deposition process of the invention, the leg material is present in an essentially amorphous form. Due to the subsequent heat treatment according to the invention, a phase conversion occurs which depends essentially upon the matrix and is not affected by the dopant. A possible reduction in the dopant concentration during the vaporization process, may be compensated for by the fact that the dopant content in the starting material is selected to be correspondingly higher. The higher vaporization temperature of the dopant, such as, for example of the indium, as compared to that of the components of the semiconductor compound, must be taken into consideration. This prerequisite is already met, however, by the flash-vaporization, wherein the vaporizer is maintained at a temperature that is generally considerably higher than the vaporization temperature of the individual components of the semiconductor compound.

A marked influence upon the structure of the vapor-deposited legs is obtained by the fact that, in accordance with the invention, the flash-vaporization together with the low temperature of the unheated carrier material, produces a stoichiometric precipitation or deposition, and the vapor-deposited material, in fact, essentially amorphous, is present in the form of a semiconductor component, and not as a mixture of the individual components.

The same compound semiconductor, having different dopant, however, may be used for vapor-depositing both legs of a thermocouple element of opposite types of conductivity. For example, a p-doped semiconductor compound may initially be vapor-deposited on a carrier by using an appropriate mask. The mask may then be exchanged or, if the vapor-deposited legs and the connecting bridges are symmetrically disposed, the mask need only be reversed and the same, though now n-doped, semiconductor compound can then be vapor-deposited.

The granulation or grain size of the original or starting material is selected so that it is sufficiently small to assure a flash-vaporization and to substantially prevent sputtering or spraying off of the material.

The contact bridges of the thermocouple element legs that are vapor-deposited in the form of a sinuous or meander-shaped band, may lie parallel to and at a predetermined distance from the lateral boundary of the carrier, which is advantageously formed of a synthetic resin, such as polyamide, for example.

In accordance with a further feature of the invention, the synthetic resin foil is wound spirally into a roll, or several synthetic resin foils may be stacked one upon the other so that the thermocouple element legs of successively following synthetic resin foils may be insulated against one another, by the material of the foils proper.

In accordance with an especially advantageous feature of the invention, both flat sides of the carrier are provided with thermocouple elements. In such a case, a thin layer of electrically insulating material, such as silicon oxide, for example, can be vapor-deposited upon the carrier.

In accordance with added features of the invention, the front faces of the rolls or the lateral faces of the stacked synthetic resin foils are encased with cast resin, and heat exchangers are mounted upon the front faces of the rolls or upon the lateral faces of the stacked foils. In order to improve the heat contact, a metal layer is also applied to the cast resin. A radio-isotope, such as plutonium 238, for example, may be used for the hot side of the thermoelectric generator, in order to take into account specifications and regulations with respect to protection against radiation.

Other features which are considered as characteristic for the invention are set forth in the appended claims.

Although the invention is illustrated and described herein as method and device for producing a thermoelectric generator, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing, in which.

Figure 1:
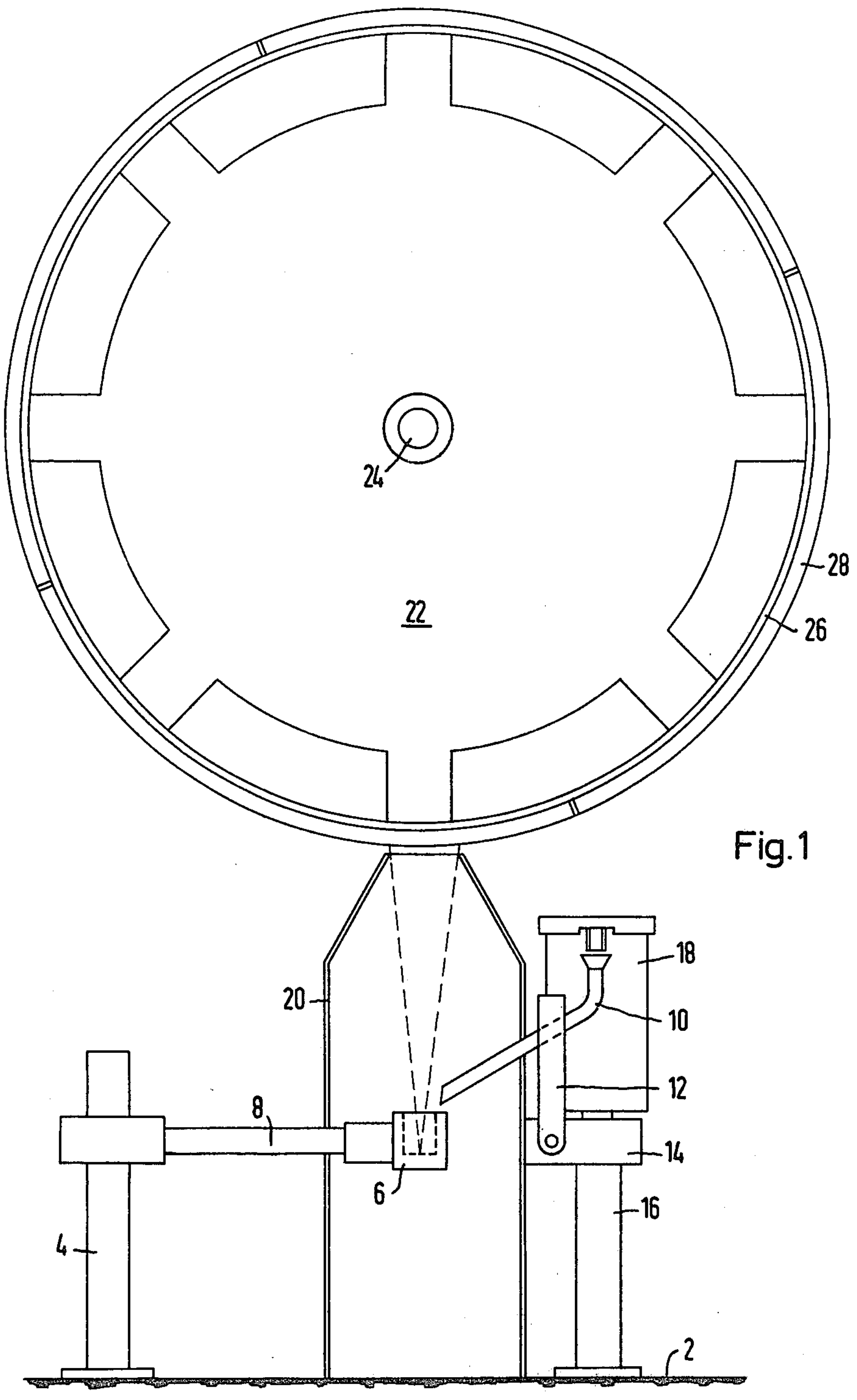
FIG. 1 is a schematic elevational view of an evaporation installation for carrying out the method of the invention.

Referring now to the drawing and first particularly to FIG. 1 thereof, there is shown a base plate 2 of a further nonillustrated evacuated vessel on which a support or post 4 is mounted which functions simultaneously as a current supply lead for a vaporizer 6, and which is formed of copper, for example.

The vaporizer 6 may have the construction of a boat, for example. It is pivotable with an electrode 8 by which it is secured to the current supplying post 4 and is adjustable in elevation with the electrode 8 relative to the post 4. The vaporizer 6 is preferably made of tungsten or molybdenum or also of tantalum. Granulated semiconductor compound is supplied to the vaporizer 6 through a copper tube 10 which is secured by a holder 12 to another electrode 14 which is, in turn, mounted on a post 16. The aforementioned parts should be made of heat-resistant material and cooled, in addition, by a liquid, for example. The granulated semiconductor compound is conveyed by a conventional worm conveyor 18. The conveyor 18 has a tubular outlet opening located above a funnel-shaped widening of one end of the supply tube 10, the other end thereof being located above the vaporizing boat 6. A diaphragm 20 is mounted around the vaporizer 6 and is preferably formed of stainless steel. The diaphragm 20 is provided at the upper end thereof with a passage opening for the semiconductor material that evaporates in the boat 6. The material which evaporates substantially in rectilinear direction from the bottom surface of the vaporizer 6 passes, within angular limits indicated by the dotted lines, through the opening of the diaphragm, toward the cylindrical casing surface of a drum 22, which may also be formed of stainless steel and which is mounted so as to be rotatable about an axis 24. Mounted on the outer surface of the hollow cylinder 26 of the drum 22, are the carriers for the material to be vapor-deposited thereon, the carriers being clamped to the outer surface of the drum 22 by means of tightening or clamping segments 28. As the drum 22 is turned, either continuously or step-wise, new portions or sections of the carriers for the semiconductor-material that is to be vapor-deposited appear in succession in front of the opening of the diaphragm 20 and are coated by the vaporized semiconductor material emanating from the vaporizer 6.

The diameter of the drum 22 may be 360 mm, for example. Then, band or tape-shaped carriers of 1 m length may be arranged adjacent one another successively in axial direction of the drum and extending over the peripheral surface of the drum.

Figure 2:
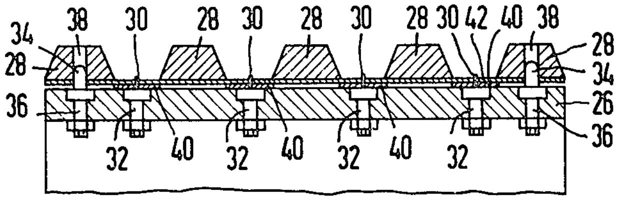
FIGS. 2 and 3 are, respectively, enlarged fragmentary sectional and plan views of the drum of FIG. 1 showing lengths of carriers mounted thereon.

As shown in the cross sectional view through the cylinder wall 26 of the drum 22, according to FIG. 2, five tensioning or clamping segments 28 are disposable adjacent one another on the drum 26, successively in axial direction of the drum for use in securely clamping suitable masks to the casing surface of the cylinder 26. A suitable tool or device is used for punching holes having a diameter of 0.032 mm, for example, and mutually spaced apart a distance of 70 mm, for example, which serve to hold and fix the bands or tapes. Pins 30 having a diameter of 0.3 mm and threadably secured by bolts 32 in the cylinder wall 26 are receivable respectively in the holes punched in the bands 40. The segments 28 are also secured by pins 34 that are similarly threadably affixed to the cylinder wall 26 by suitable bolt fasteners 36. The somewhat thicker pins 34 are receivable in suitably provided bores 38 formed in the masks and in the segments 28.

Figure 3:
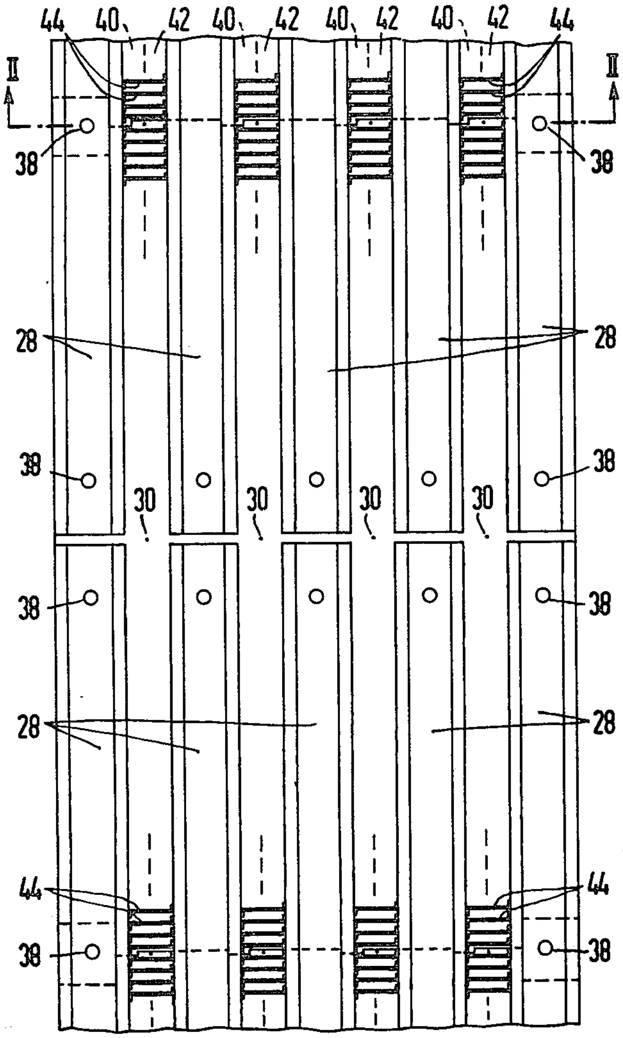

The carrier tapes or bands 40 that are formed of suitable synthetic resin are shown in top plan view in FIG. 3. The clamping segments 28 extend, respectively, over a partial length of the circumference of the drum 22. In FIG. 3, one of the legs is shown along a partial length of the carriers 40. The illustrated slots 44 are formed in a mask or masks 42 which may be of stainless steel and are fixed by the clamping segments 28, on top of the carriers 40. The material to be vapor-deposited passes through the slots 44 formed in the masks 42 so as to coat the correspondingly shaped underlying surfaces of the synthetic carriers 40.

Figure 4:
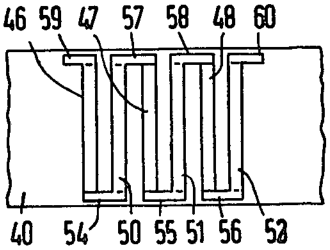
FIG. 4 is a further enlarged fragmentary plan view of a band-shaped carrier showing the arrangement of the legs of a thermoelectric generator thereon.

FIG. 4 illustrates a portion of a thermocouple element having p-conducting legs 46 to 48 and n-conducting legs 50 to 52. The legs are disposed on a carrier 40, together with respective bridges 54 and 58 and two terminal contacts 59 and 60. The carrier 40 is preferably formed of a foil of a suitable synthetic resin. The foil is 7.5 mm wide and 12 $\mu$m thick, for example. Since care must be taken that the tape 40 and the appertaining mask 42 be accurately secured relative to one another, the legs with the bridges coordinated therewith may be vapor-deposited in two successive operations, between which the respective mask is merely reversed. Then, for example, the p-conductive legs 46 to 48 are vapor-deposited upon a preferably synthetic resin foil carrier 40, together with the corresponding bridges 54 to 58 and two of the terminal contacts 59 and 60, in the course of the first operation. Then, the mask 42 is turned over and the n-conductive legs 50 to 52 are vapor-deposited in a second operation. In the second operation, suitable material is again vapor-deposited upon the bridge material.

It is also possible, however, to vapor-deposit only the p-conductive legs 46 to 48 in one operation and only the N-conductive legs 50 to 52 in another operation, and subsequently, in the course of a further operation, to vapordeposit the bridges 54 to 58 and the terminal contacts 59 and 60.

Prior to the vapor-deposition operations, the carriers 40 are cleansed in a liquid cleaning apparatus, advantageously by ultrasonic means, and are subsequently heated, preferably in vacuum and, for example, at a temperature of 180°C for about one hour.

In addition, a pretreatment can be advantageously provided within the vacuum installation. By heating the carriers 40 to incandescent temperature in an argon atmosphere at a pressure of about $10^{-1}$ Torr with an incandescent current of about 150 mA for about 10 min., this further processing of the carriers 40 is executed to advantage. The incandescent treatment is advantageously performed also prior to each successive operation, i.e., prior to vapor-deposition of the second leg and, if necessary, prior to vapor-deposition of the bridges and of the terminal contacts. The following are important for carrying out the vapor-deposition operation: the vacuum, the material granulation, and the vaporizer temperature. The vapor-depositing is advantageously effected at a pressure of about $10^{-5}$ Torr. The thickness of the deposited coating depends upon the shape and dimensions of the individual elements on the carrier. It can be determined during the vapor-deposition operations, for example, with a calibrated oscillator crystal, or it may be measured after the vapor-deposition operation, by means of an interference microscope at glasses which are mounted on the periphery of the drum and are vapor-deposited, as well.

On the other hand, the extent of granulation of the material that is to be selected and the vaporizer temperature are essentially determined by the material to be vaporized. If too low a temperature is selected, the required flash vaporization will not occur. If the temperature is too high, a considerable part of the material will spout or spring out of the crucible or boat 6 and a controlled vaporization will not be realized.

If legs are to be produced, for example, from a p-conductive zinc-antimonide compound (ZnSb) containing 34.6 percent by weight of zinc and 64.3 percent by weight of antimony and, in order to improve the p-conductivity, also containing traces of p-doping materials such as 1.0 percent by weight of tin and 0.1 percent by weight of silver, for example, then, at the indicated vacuum, the temperature of the vaporizing crucible should advantageously be maintained at least at 900°C, preferably at approximately 1000°C. The grain size of the ZnSb is preferably selected between 0.1 and 0.6 mm, and especially at 0.2 to 0.4 mm. The layer thickness selected for a leg shape such as is shown in FIG. 4, is approximately 0.5 to 4.0 $\mu$m, and especially about 1 to 2 $\mu$m.

Under the foregoing conditions, vapor-deposited legs are obtained having a Seebeck coefficient of about $\alpha = 820\ \mu V/°C$ at a temperature of 50°C, and a specific electrical resistance $\rho$ of about 25 to 100 ohm-cm at room temperature. After a subsequent heat treatment according to the invention in vacuo for a period of two hours, at 240°C, for example, these factors will have changed to $\alpha = 146\ \mu V/°C$ and $\rho = 2.44.10^{-3}$ ohm-cm, with the phase conversion. Thus, although the Seebeck coefficient is diminished by a factor of about 5, the electrical conductivity is increased by four orders of magnitude, so that the effectivity is considerably improved.

The leg material produced according to the method of the invention consequently almost attains the values of the original material which are $\alpha = 175\ \mu V/°C$ and $\rho = 1.8.10^{-3}$ ohm-cm.

We claim:

1. In a method of producing thermocouple elements, especially for low-power thermoelectric generators, having thermocouple element legs of different conductivity types that are located adjacent one another in alternating sequence, with bridges connecting the ends of the legs of different conductivity so that the legs are connected electrically in series and thermally in parallel, on an electrically insulating carrier, wherein the improvement comprises flash vaporizing ZnSb at a temperature of at least 900°C and from the resulting vapor depositing ZnSb as material for the thermocouple element legs upon the carrier, and then tempering the same to change the ZnSb structure from amorphous to crystalline.

2. In a method according to claim 1 wherein ZnSb contains a dopant selected from the group consisting of tin and silver.

3. Method according to claim 5 wherein the ZnSb to be flash vaporized has a grain size of 0.2 to 0.4 mm.

4. In a method according to claim 1 wherein the ZnSb is vaporized in a vaporizing vessel maintained at a temperature of at about 1000°C.

5. In a method according to claim 1 wherein the ZnSb to be flash vaporized is granulated and has a grain size of substantially 0.1 to 0.6 mm.

6. In a method according to claim 1 wherein the carrier has opposite flat sides, and which includes vapor-depositing the ZnSb on both sides of the carrier to form thermocouple elements on both sides thereof.

7. In a method according to claim 1 which includes vapor-depositing a layer of insulation on the vapor-deposited thermocouple elements.

8. In a method according to claim 1 which includes spraying a layer of insulation on the vapor-deposited thermocouple elements.

9. In a method according to claim 1 wherein the carrier for the thermocouple element legs is a synthetic resin foil, and which includes cleansing the carrier ultrasonically before vapor-depositing the ZnSb thereon.

10. In a method according to claim 8 which further includes heating the carrier in vacuo between the ultrasonic cleansing and the vapor depositing.

* * * * *